United States Patent [19]
Stoyan

[11] Patent Number: 5,191,365
[45] Date of Patent: Mar. 2, 1993

[54] CORNEAL CONTACT LENS AND METHOD FOR TREATING MYOPIA

[76] Inventor: Nick Stoyan, 3841 Diamante Pl., Encino, Calif. 91436

[21] Appl. No.: 748,845

[22] Filed: Aug. 23, 1991

[51] Int. Cl.⁵ .............................................. G02C 7/04
[52] U.S. Cl. ................................. 351/160 R; 351/177
[58] Field of Search ............... 351/160 R, 160 H, 161, 351/162, 177

[56] References Cited

U.S. PATENT DOCUMENTS 4,952,045 8/1990 Stoyan ........................... 351/160 R
5,024,517 6/1991 Seidner ................................. 351/161

Primary Examiner—Scott J. Sugarman
Attorney, Agent, or Firm—Poms, Smith, Lande & Rose

[57] ABSTRACT

A corneal contact lens for use in treating myopia by controlled corneal molding. The lens includes a central zone having a central zone radius of curvature and a tear zone. The tear zone is located concentrically around the central zone and has a radius of curvature which is smaller than the central zone. A transition zone is provided between the central zone and the tear zone wherein the transition zone has at least one transition ring. The lens may also include a peripheral zone which is located concentrically around the tear zone wherein the peripheral zone includes multiple peripheral curves having radii of curvature equal to or greater than the central zone.

20 Claims, 1 Drawing Sheet

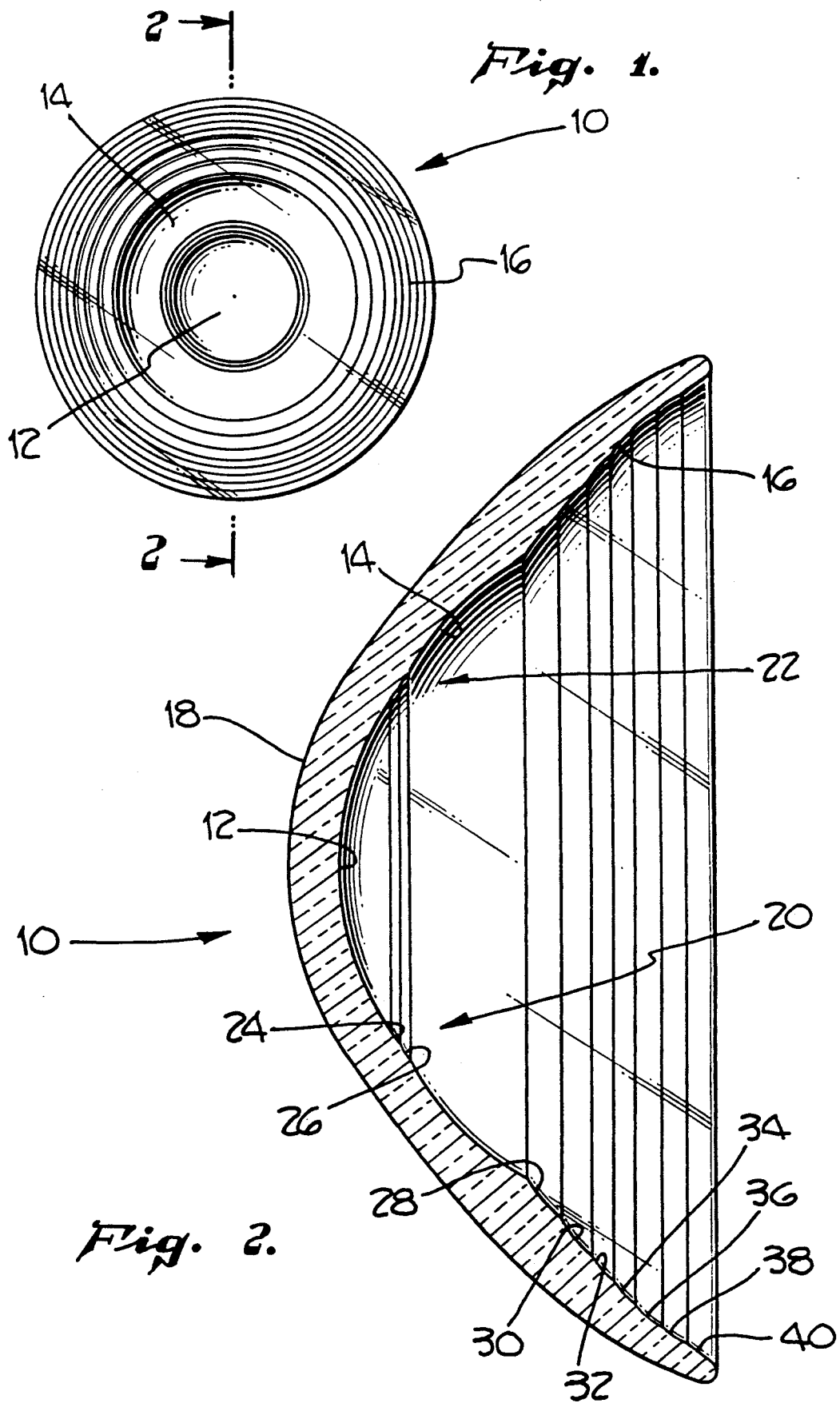

CORNEAL CONTACT LENS AND METHOD FOR TREATING MYOPIA

BACKGROUND OF THE INVENTION

1. Field of the Invention

The present invention relates generally to corneal contact lenses and their use in treating myopia. More particularly, the present invention is directed to corneal contact lenses which are shaped to provide gradual altering of the patient's cornea during continued wear to reshape the cornea to reduce the myopic condition.

2. Description of Related Art

Myopia, also known as nearsightedness, is a condition where the radius of curvature of the cornea is smaller than normal. Individuals with this condition have difficulty in focusing on distant objects because the cornea is curved too sharply to provide adequate focusing. Myopia is a common condition for which no entirely suitable permanent treatment has been developed.

One approach to correcting myopia is through surgical reshaping of the cornea. However, such surgical procedures have not been entirely proven and there is some question as to the permanency of the surgically altered lens shape.

Another approach is to alter the corneal shape by wearing corneal contact lenses which are designed to continually exert pressure on selected locations of the cornea to gradually force or mold the cornea into the desired normal corneal curvature. A retainer lens is then worn on a part time basis to prevent the cornea from returning to its original shape. This method of treatment is commonly referred to as orthokeratology. The success of any treatment by orthokeratology is dependent upon the shape and structure of the corneal contact lens.

My prior U.S. Pat. No. 4,952,045 discloses a contact lens which is specifically designed for use in treating myopia. The lens includes a central zone, a tear zone located concentrically around the central zone and an outer peripheral zone which is located concentrically around the tear zone. This lens is designed specifically so that the radius of curvature of the tear zone is smaller than the radius of curvature for both the central zone and peripheral zone. I discovered that this corneal lens configuration is useful in changing the shape of the myopic cornea to that of a normally shaped cornea. In addition, the sharper curve of the tear zone provides a ring-shaped area where tear fluid is concentrated between the lens and cornea. Although the corneal contact lens disclosed in U.S. Pat. No. 4,952,045 is well-suited for its intended purpose, there is a continual need for improvement of the design of such a lens to make it better suited for use in treating myopia.

SUMMARY OF THE INVENTION

In accordance with the present invention, a corneal contact lens for treating myopia is disclosed wherein the lens is designed to increase the effectiveness of the lens and the comfort with which the lens is worn by the patient. The lens of the present invention is an improvement upon the lens disclosed in U.S. Pat. No. 4,952,045 wherein the corneal contact lens includes a central zone and a tear zone having a radius of curvature which is smaller than that of the central zone. The present invention involves providing a transition zone located concentrically between the central zone and tear zone to provide a more gradual change in the radius of curvature to thereby enhance the effectiveness and the wearing comfort of the lens.

As a feature of the present invention, the transition zone includes a plurality of transition rings having different radii of curvature which gradually increase from a radially inward transition ring to a radially outward transition ring. In this way, a gradual change in radius of curvature is provided between the central zone and tear zone. This gradual change in curvature increases the effectiveness of the lens and reduces the discomfort to the lens wearer.

As another feature of the present invention, the peripheral zone located concentrically around the tear zone includes a plurality of peripheral rings each having a different radius of curvature wherein the radius of curvature of the peripheral rings increases from the radially, inward peripherally ring to the radially outward peripheral ring. This provides for a gradual increase in the radius of curvature between the tear zone and peripheral zone. Discomfort associated with wearing this type of corneal contact lens is reduced due to &he gradual increase in radius of curvature in the transition zone. In addition to reducing the discomfort associated with wearing such lenses, the present invention also provides for an improved fit between the posterior surface of the contact lens and the cornea. The result is a more effective lens.

The above described and many other features and attendant advantages of the present invention will become better understood by reference to the following detailed description when viewed in conjunction with the accompanying drawings.

BRIEF DESCRIPTION OF THE DRAWINGS

FIG. 1 is a front view of the preferred exemplary lens shown in FIG. 1.

FIG. 2 is a sectional side view of a preferred exemplary corneal contact lens in accordance with the present invention.

DETAILED DESCRIPTION OF THE PREFERRED EXEMPLARY EMBODIMENTS

The present invention is an improvement upon my prior U.S. Pat. No. 4,952,045. The contents of my prior patent is hereby incorporated by reference.

A preferred exemplary corneal contact lens in accordance with the present invention is shown generally at 10 in FIGS. 1 and 2. The lens 10 includes a central portion or zone 12, a tear portion or zone 14 and a peripheral portion or zone 16. The overall dimension of the lens 10 are within the normal ranges for corneal contact lenses. The outside diameter of the lens is typically between about 5 to 20 millimeters with other diameters being possible in special cases. The lens has a lateral or cross-sectional thickness of between about 0.05 millimeters to 10 millimeters. Thicknesses in the range of 0.05 to 0.5 millimeters are preferred.

The lens has an anterior surface 18 which is shaped in the same manner as conventional contact lenses. The posterior surface 20 is shaped to provide the central zone 12, tear zone 14 and peripheral zone 16 as will be described in detail below. The lateral thickness of the lens 10 will vary since the anterior surface curve 18 does not match the various curves of the posterior surface 20. If desired, both the anterior surface 18 and posterior curve 20 can be the same so that the lateral thickness of the lens is uniform throughout the entire lens cross-section. However, the lens cross-sectional configuration as shown in FIG. 2 is preferred.

The central zone 12 has a radius of curvature of between about 4 to 20 millimeters. The diameter of the central zone is between about 2-12 millimeters. Preferred ranges for the radius of curvature and diameter are 7 to 10 millimeters and 4 to 8 millimeters respectively.

In accordance with the present invention, a transition zone 22 is provided between the central zone 12 and tear zone 22. The transition zone 14 is designed to provide a gradual transition between the larger radius of curvature of the central zone 12 and the smaller radius of curvature of the tear zone 14. The transition zone 22 preferably has at least 1 transition curve and preferably 2 or more.

In FIG. 2, two transition curves 24 and 26 are shown. The transition curve 24 preferably has an optical zone, radial thickness or chord length which is between 0.05 millimeter and 0.5 millimeter. Preferably, the optical zone will be about 0.1 millimeter. The radius of curvature of the first transition curve 24 is preferably at least 0.1 millimeter less than the radius of curvature of the central zone 12. Preferably, the radius of curvature of the transition curve 24 will be about 0.25 millimeter less than the radius of curvature of the central zone 12.

The second transition curve 26 also preferably has a chord length or optical zone of between about 0.05 millimeter and 0.5 millimeter with 0.1 millimeter being preferred. The radius of curvature is preferably between about 0.1 and 0.5 less than the radius of curvature of the first transition curve 24. More than two transition curves may be used so long as they provide a gradual transition between the radius of curvature of the central zone 12 and the smaller radius of curvature of tear zone 14. The overall transition zone should have a chord length of less than 1.0 millimeter.

The tear zone 14 forms a ring around the transition zone 22 and is integral therewith. The radial thickness, optical zone or chord length of the tear zone 14 is between about 0.2 to 10 millimeters. The radius of curvature of the tear zone 14 is between about 0.1 to 12 millimeters. The preferred ranges are from 0.2 to 5 millimeters for the optical zone and 7 to 10 millimeters for the radius of curvature.

As disclosed in detail in my prior U.S. Pat. No. 4,952,045, an important feature is that the radius of curvature of the tear zone 14 must be smaller than the radius of curvature for the central zone 12. This creates a zone of increased curvature around the central zone which provides desirable reshaping of the cornea. In addition, a circular tear channel or duct is formed between the tear zone 14 and the eye to provide a concentrated circular zone or reservoir of tear fluid which helps position the lens centrally on the cornea and enhances lens wearing comfort. Preferably, the radius of curvature of the tear zone will be between 0.5 millimeter and 1.0 millimeter less than the radius of curvature of the central zone 12.

The peripheral zone 16 is integral with the remainder of the lens in that it is preferably machined or molded from the same piece of polymer material. The peripheral zone 16 has a radius of curvature of between about 4 to 20 millimeters. The optical zone or chord length of the ring defined by the peripheral zone 16 is between about 0.2 to 12 millimeters. The preferred ranges are 8 to 15 millimeters for the radius of curvature and 0.5 to 6 millimeters for the chord length.

The peripheral zone 16 may have a single radius of curvature. However, as a feature of the present invention, the peripheral zone 16 is divided into a plurality of peripheral curves 28, 30, 32, 34, 36, 38 and 40. The radii of curvature for the transition curves 28-40 gradually increase from the radially inner curve 28 to the outermost curve 40. Preferably, the innermost peripheral curve 28 will have a radius of curvature slightly above the radius of curvature for the tear zone 14. The outermost peripheral curve 40 will have the largest radius of curvature.

The chord length or optical zone for each of the peripheral curves 28-40 is preferably between about 0.05 millimeter and 0.1 millimeter. The number of peripheral curves present can be varied if desired; however, it is preferred that at least 5 curves be provided in the peripheral zone 16. In addition, the chord length of each of the peripheral curves may be varied. For example, the chord length of peripheral curve 28 may be longer than the chord length of the other peripheral curves. Alternatively, the innermost peripheral curve 28 and outermost peripheral curve 40 may have chord lengths which are longer than the peripheral curves located therebetween. The number of peripheral curves can be increased to provide a continuous aspheric peripheral zone in which the radius of curvature gradually increases towards the outer radial edge of the lens.

The lens 10 can be made according to any of the known machining or molding processes which allow variable radii of curvature lenses to be formed. The preferred procedure is to machine the lens from buttons or disks as is commonly known. The materials used in making the lens 10 can be any of the conventional polymers used in oxygen permeable hard, semi-hard and soft hydrogel corneal contact lenses. These materials include a variety of silicone and fluorine substituted acrylates and the soft hydrogel or silicone lens materials used in contact lenses. If desired, the three zones 12, 14 and 16 can be made from the same lens material or different lens materials. For example, a suitable lens 10 could include a hard plastic central zone 12 and peripheral zone 16 while having a semi-hard or soft tear zone 14. Additional control over corneal reshaping or molding is provided by this ability to vary the hardness of the individual zones.

As an example, a preferred exemplary lens will have a central zone 12 with an optical zone or diameter of 6 millimeters and radius of curvature of 8.0 millimeters. The inner transition zone 24 has an optical zone of 0.1 millimeter and a radius of curvature of 7.75 millimeter. The second transition zone 26 also has an optical zone of 0.1 millimeter with the radius of curvature being decreased to 7.5 millimeters. The tear zone 14 has an optical zone which is 2.2 millimeters long and a radius of curvature of 7.25 millimeters. All of the peripheral curves 28-40 have an optical zone of 0.09 millimeter. The radius of curvature for the innermost peripheral curve 28 is 7.55 millimeters. The radius of curvature for the second peripheral curve 30 is 7.95 millimeters. The radius of curvature for the third peripheral curve 32 is 8.75 millimeters. The radius of curvature for the fourth peripheral curve 34 is 9.5 millimeters. The radius of curvature for the fifth peripheral curve 36 is 10.25 millimeters. The radius of curvature for the sixth peripheral curve 38 is 11.0 millimeters and the radius of curvature for the outermost peripheral curve 40 is 11.75 millimeter. The first two peripheral curves 28 and 30 preferably function as a transition between the tear zone 14 and the peripheral zone 16.

Having thus described exemplary embodiments of the present invention, it should be noted by those skilled in the art that the within disclosures are exemplary only and that various other alternatives, adaptations and modifications may be made within the scope of the present invention. Thus, by way of example and not of limitation, the number of peripheral curves could be increased from the 7 shown in FIGS. 1 and 2 to 10 curves or more. Similarly, the number of transition curves between the central zone 12 and the tear zone 14 could also be increased. The only limitation is that the overall optical zone for the transition zone 20 and the peripheral zone 16 should remain within the limits set forth above.

Accordingly, the present invention is not limited to the specific embodiments as illustrated herein, but is only limited by the following claims.

What is claimed is;

1. A corneal contact lens for shaping of the cornea having a posterior surface for contact with the cornea of an eye, said corneal contact lens comprising:
   a central zone having a central zone radius of curvature and a central zone diameter;
   a tear zone located concentrically around said central zone and having a tear zone radius of curvature and a tear zone radial thickness, wherein said tear zone radius of curvature is smaller than said central zone of radius of curvature;
   a transition zone located concentrically between said central zone and said tear zone, said transition zone comprising at least one transition ring having a radius of curvature which is between the radius of curvature of said central zone and said tear zone, and wherein said transition has a radial thickness; and
   a peripheral zone located concentrically around said tear zone, said peripheral zone being integral with said tear zone and having a peripheral zone radius of curvature wherein said peripheral zone radius of curvature is greater than or equal to said central zone radius of curvature.

2. A corneal contact lens according to claim 1 wherein said peripheral zone comprises a plurality of peripheral rings each having a different radius of curvature wherein the radius of curvature of said peripheral rings increases from the radially inward peripheral ring to the radially outward peripheral ring.

3. A corneal contact lens according to claim 1 wherein said transition zone comprises a plurality of transition rings each having a different radius of curvature wherein the radius of curvature of said transition rings increases from the radially inward transition ring to the radially outward transition ring.

4. A corneal contact lens according to claim 3 wherein said transition zone comprises between 2 to 10 transition rings and wherein the radial thickness of said transition zone is between about 0.01 to 1.0 millimeters.

5. A corneal contact lens according to claim 2 wherein said peripheral zone comprises between 2 to 20 peripheral rings and wherein the radial thickness of said peripheral rings is between about 0.01 to 1.0 millimeters.

6. A corneal contact lens according to claim 1 wherein the radius of curvature of said central zone is between about 4 to 20 millimeters.

7. A corneal contact lens according to claim 6 wherein the radius of curvature of said tear zone is between about 0.1 to 12 millimeters.

8. A corneal contact lens according to claim 7 wherein the radius of curvature of said peripheral zone is between about 4 to 20 millimeters.

9. A corneal contact lens according to claim 4 wherein the diameter of said central zone is between about 2 to 12 millimeters and the radial thickness of said tear zone is between about 0.2 to 10 millimeters.

10. A corneal contact lens according to claim 9 wherein the radial thickness of said peripheral zone is between about 0.2 to 1 millimeters.

11. A corneal contact lens according to claim 4 wherein the radial thickness of said transition rings is about 0.1 millimeter.

12. A corneal contact lens according to claim 5 wherein the radial thickness of said peripheral rings is about 0.1 millimeter.

13. A corneal contact lens according to claim 5 wherein the peripheral zone comprises between 5 to 15 peripheral rings.

14. A corneal contact lens according to claim 1 wherein said lens is made from an oxygen permeable semihard or hard plastic.

15. A corneal contact lens according to claim 1 wherein said lens is made from a soft hydrogel plastic.

16. A corneal contact lens according to claim 1 wherein said lens is made from soft silicone polymer.

17. A corneal contact lens according to claim 1 which includes a central zone made from hard or semihard plastic and a tear zone made from a soft polymer.

18. A corneal contact lens according to claim 17 further including a peripheral zone made from a soft polymer.

19. A method for treating a myopic eye having a cornea with a given shape, wherein said method comprises the step of wearing a lens on the cornea of said eye for a sufficient time to alter the shape of said cornea, said lens comprising:
   a central zone having a central zone radius of curvature and a central zone diameter;
   a tear zone located concentrically around said central zone and having a tear zone radius of curvature and a tear zone radial thickness, wherein said tear zone radius of curvature is smaller than said central zone radius of curvature;
   a transition zone located concentrically between said central zone and said tear zone, said transition zone comprising at least one transition ring having a radius of curvature which is between the radius of curvature of said central zone and said tear zone, and wherein said transition has a radial thickness; and
   a peripheral zone located concentrically around said tear zone, said peripheral zone being integral with said tear zone and having a peripheral zone radius of curvature wherein said peripheral zone radius of curvature is greater than or equal to said central zone radius of curvature.

20. A method for treating a myopic eye according to claim 19 wherein said peripheral zone comprises a plurality of peripheral rings each having a different radius of curvature wherein the radius of curvature of said peripheral rings increases from the radially inward peripheral ring to the radially outward peripheral ring.

* * * * *

UNITED STATES PATENT AND TRADEMARK OFFICE
CERTIFICATE OF CORRECTION

PATENT NO. : B1 5,191,365
DATED : August 2, 1996
INVENTOR(S) : Nick Stoyan

Page 1 of 2

It is certified that error appears in the above-identified patent and that said Letters Patent is hereby corrected as shown below:

2. [A corneal contact lens according to claim 1 wherein] A corneal contact lens for shaping of the cornea having a posterior surface for contact with the cornea of an eye, said corneal contact lens comprising:

a central zone having a central zone radius of curvature, and a central zone lateral thickness, and a central zone diameter;

a tear zone located concentrically around said central zone and having a tear zone radius of curvature, a tear zone lateral thickness, and a tear zone radial thickness, wherein said tear zone radius of curvature is smaller than said central zone of radius of curvature;

a transition zone located concentrically between said central zone and said tear zone, said transition zone comprising at least one transition ring having a radius of curvature which is between the radius of curvature of said central zone and said tear zone, wherein said transition has a radial thickness; and a peripheral zone located concentrically around said tear zone, said peripheral zone being integral with said tear zone and having a peripheral zone radius of curvature and a peripheral zone lateral thickness, wherein said peripheral zone radius of curvature is greater than or equal to said central zone radius of curvature and wherein said central zone and said peripheral zone each have a lateral thickness which is greater than the lateral thickness of said tear zone; and said peripheral zone comprises a plurality of peripheral rings each having a different radius of curvature wherein the radius of curvature of said peripheral rings increases from the radially inward peripheral ring to the radially outward peripheral ring.

3. [A corneal contact lens according to claim 1 wherein] A corneal contact lens for shaping of the cornea having a posterior surface for contact with the cornea of an eye, said corneal contact lens comprising:

a central zone having a central zone radius of curvature, and a central zone lateral thickness, and a central zone diameter;

a tear zone located concentrically around said central zone and having a tear zone radius of curvature, a tear zone lateral thickness, and a tear zone radial thickness, wherein said tear zone radius of curvature is smaller than said central zone of radius of curvature;

a transition zone located concentrically between said central zone and said tear zone, said transition zone comprising at least one transition ring having a radius of curvature which is between the radius of curvature of said central zone and said tear zone, wherein said transition has a radial thickness; and a peripheral zone located concentrically around said tear zone, said peripheral zone being integral

UNITED STATES PATENT AND TRADEMARK OFFICE
CERTIFICATE OF CORRECTION

PATENT NO. : B1 5,191,365
DATED : August 2, 1996
INVENTOR(S) : Nick Stoyan

It is certified that error appears in the above-identified patent and that said Letters Patent is hereby corrected as shown below:

with said tear zone and having a peripheral zone radius of curvature and a peripheral zone lateral thickness, wherein said peripheral zone radius of curvature is greater than or equal to said central zone radius of curvature and wherein said central zone and said peripheral zone each have a lateral thickness which is greater than the lateral thickness of said tear zone; and said transition zone comprises a plurality of transition rings each having a different radius of curvature wherein the radius of curvature of said transition rings increases from the radially inward transition ring to the radially outward transition ring.

Signed and Sealed this

Twenty-second Day of May, 2001

Attest:

NICHOLAS P. GODICI

Attesting Officer

Acting Director of the United States Patent and Trademark Office

REEXAMINATION CERTIFICATE (4135th)

United States Patent [19]
Stoyan

[11] B1 5,191,365
[45] Certificate Issued Aug. 15, 2000

[54] CORNEAL CONTACT LENS AND METHOD FOR TREATING MYOPIA

[75] Inventor: Nick Stoyan, Encino, Calif.

[73] Assignee: Contex, Inc., Sherman Oaks, Calif.

Reexamination Request:
No. 90/004,323, Aug. 2, 1996

Reexamination Certificate for:
Patent No.: 5,191,365
Issued: Mar. 2, 1993
Appl. No.: 07/748,845
Filed: Aug. 23, 1991

[51] Int. Cl.[7] .................................................. G02C 7/04
[52] U.S. Cl. ..................................... 351/160 R; 351/177
[58] Field of Search ........................... 351/160 R, 160 H, 351/161, 162, 177

[56] References Cited

U.S. PATENT DOCUMENTS 4,166,255  8/1979  Graham ................................ 351/160 H

OTHER PUBLICATIONS

Fontana, Alfred A. "Orthokeratology" Orthokeratology, vol. 3, 1976, pp. 81–83.

Hanisch, Phillip B., O.D. "Orthokerotology Through The Use Of An "O.K." Fitting Set" Orthokeratology, vol. 3, 1976 pp. 133–136.

*Primary Examiner*—Scott J. Sugarman

[57] ABSTRACT

A corneal contact lens for use in treating myopia by controlled corneal molding. The lens includes a central zone having a central zone radius of curvature and a tear zone. The tear zone is located concentrically around the central zone and has a radius of curvature which is smaller than the central zone. A transition zone is provided between the central zone and the tear zone wherein the transition zone has at least one transition ring. The lens may also include a peripheral zone which is located concentrically around the tear zone wherein the peripheral zone includes multiple peripheral curves having radii of curvature equal to or greater than the central zone.

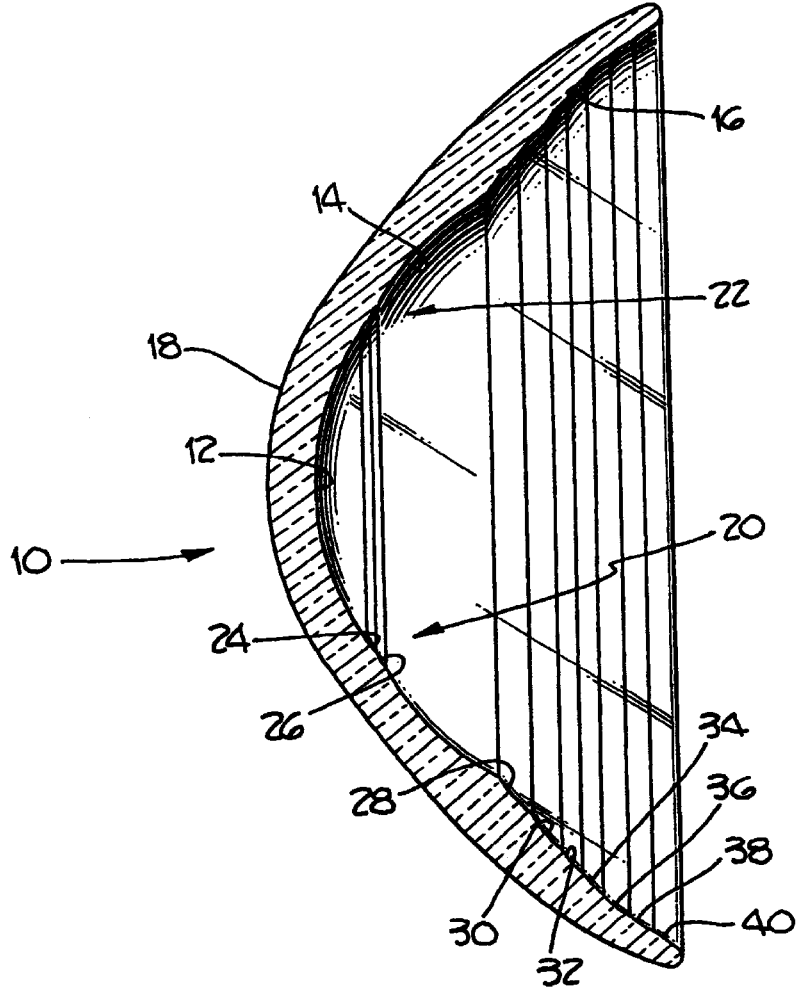

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–5 and 9–13 is confirmed.

Claims 1, 6–8 and 14–18 are cancelled.

Claim 19 is determined to be patentable as amended.

Claim 20, dependent on an amended claim, is determined to be patentable.

19. A method for treating a myopic eye having a cornea with a given shape, wherein said method comprises the step of wearing a lens on the cornea of said eye for a sufficient time to alter the shape of said cornea, said lens comprising:

a central zone having a central zone radius of curvature, *a central zone lateral thickness,* and a central zone diameter;

a tear zone located concentrically around said central zone and having a tear zone radius of curvature, *a tear zone lateral thickness,* and a tear zone radial thickness, wherein said tear zone radius of curvature is smaller than said central zone of radius of curvature;

a transition zone located concentrically between said central zone and said tear zone, said transition zone comprising at least one transition ring having a radius of curvature which is between the radius of curvature of said central zone and said tear zone, and wherein said transition has a radial thickness; and a peripheral zone located concentrically around said tear zone, said peripheral zone being integral with said tear zone and having a peripheral zone radius of curvature *and a peripheral zone lateral thickness,* wherein said peripheral zone radius of curvature is greater than or equal to said central zone radius of curvature *and wherein said central zone and said peripheral zone each have a lateral thickness which is greater than the lateral thickness of said tear zone.*

* * * * *